United States Patent
Eder et al.

(10) Patent No.: US 9,682,740 B2
(45) Date of Patent: Jun. 20, 2017

(54) SLIP FIT NECK ADAPTER

(71) Applicants: Chris Eder, Addison, TX (US); Christopher Jahn Moos, Corinth, TX (US)

(72) Inventors: Chris Eder, Addison, TX (US); Christopher Jahn Moos, Corinth, TX (US)

(73) Assignee: MISFIT INDUSTRIES US LLC, Addison, TX (US)

( * ) Notice: Subject to any disclaimer, the term of this patent is extended or adjusted under 35 U.S.C. 154(b) by 0 days.

(21) Appl. No.: 14/971,528

(22) Filed: Dec. 16, 2015

(65) Prior Publication Data
US 2016/0096575 A1    Apr. 7, 2016

Related U.S. Application Data

(63) Continuation of application No. 14/121,555, filed on Sep. 17, 2014, now Pat. No. 9,266,578.

(51) Int. Cl.
| | |
|---|---|
| *B62K 21/04* | (2006.01) |
| *B62K 11/02* | (2006.01) |
| *B62K 21/00* | (2006.01) |
| *B62K 19/30* | (2006.01) |
| *B62K 19/32* | (2006.01) |
| *B62K 13/08* | (2006.01) |

(52) U.S. Cl.
CPC .............. *B62K 21/04* (2013.01); *B62K 11/02* (2013.01); *B62K 13/08* (2013.01); *B62K 19/30* (2013.01); *B62K 19/32* (2013.01); *B62K 21/00* (2013.01)

(58) Field of Classification Search
CPC ............................... B62K 19/32; B62K 21/04
See application file for complete search history.

(56) References Cited

U.S. PATENT DOCUMENTS

| | | | | |
|---|---|---|---|---|
| 4,565,384 A | * | 1/1986 | Dehnisch | B62K 21/22 280/279 |
| 7,438,306 B2 | * | 10/2008 | Mrdeza | B62K 21/04 280/274 |
| 7,637,521 B2 | * | 12/2009 | Grant | B62K 13/00 280/276 |
| 9,079,631 B1 | * | 7/2015 | Costa | B62K 21/22 |

* cited by examiner

*Primary Examiner* — Kevin Hurley
(74) *Attorney, Agent, or Firm* — Quarles & Brady LLP

(57) ABSTRACT

A replacement neck assembly for a motorcycle modifies the motorcycle frame to accept a larger front wheel diameter than the factory original, the replacement neck assembly providing the replacement neck, an optional fairing mount, the replacement neck accepting a factory or modified triple tree, whereby the motorcycle frame can accept the large front wheel without affecting the operating height of the motorcycle.

15 Claims, 10 Drawing Sheets

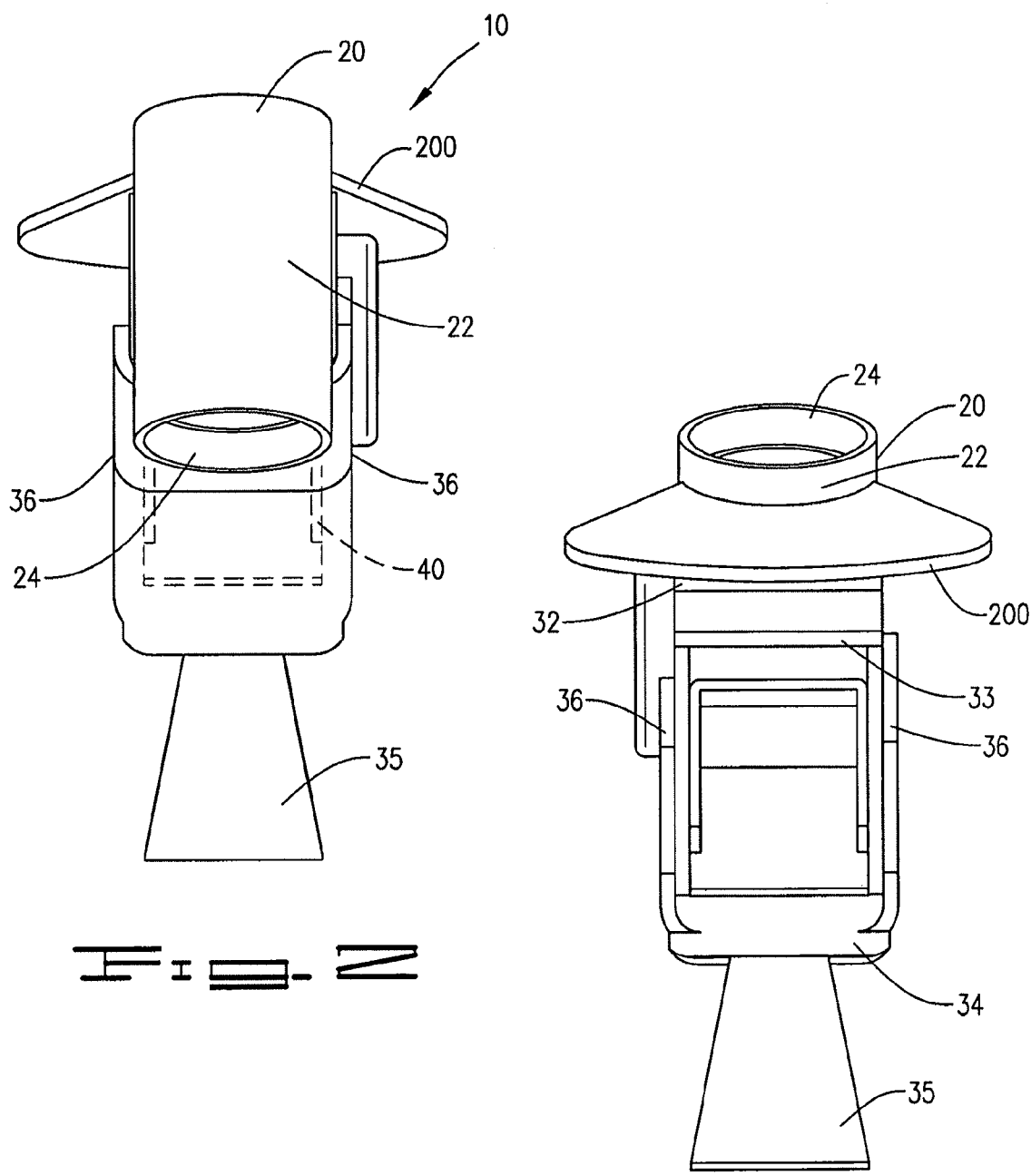

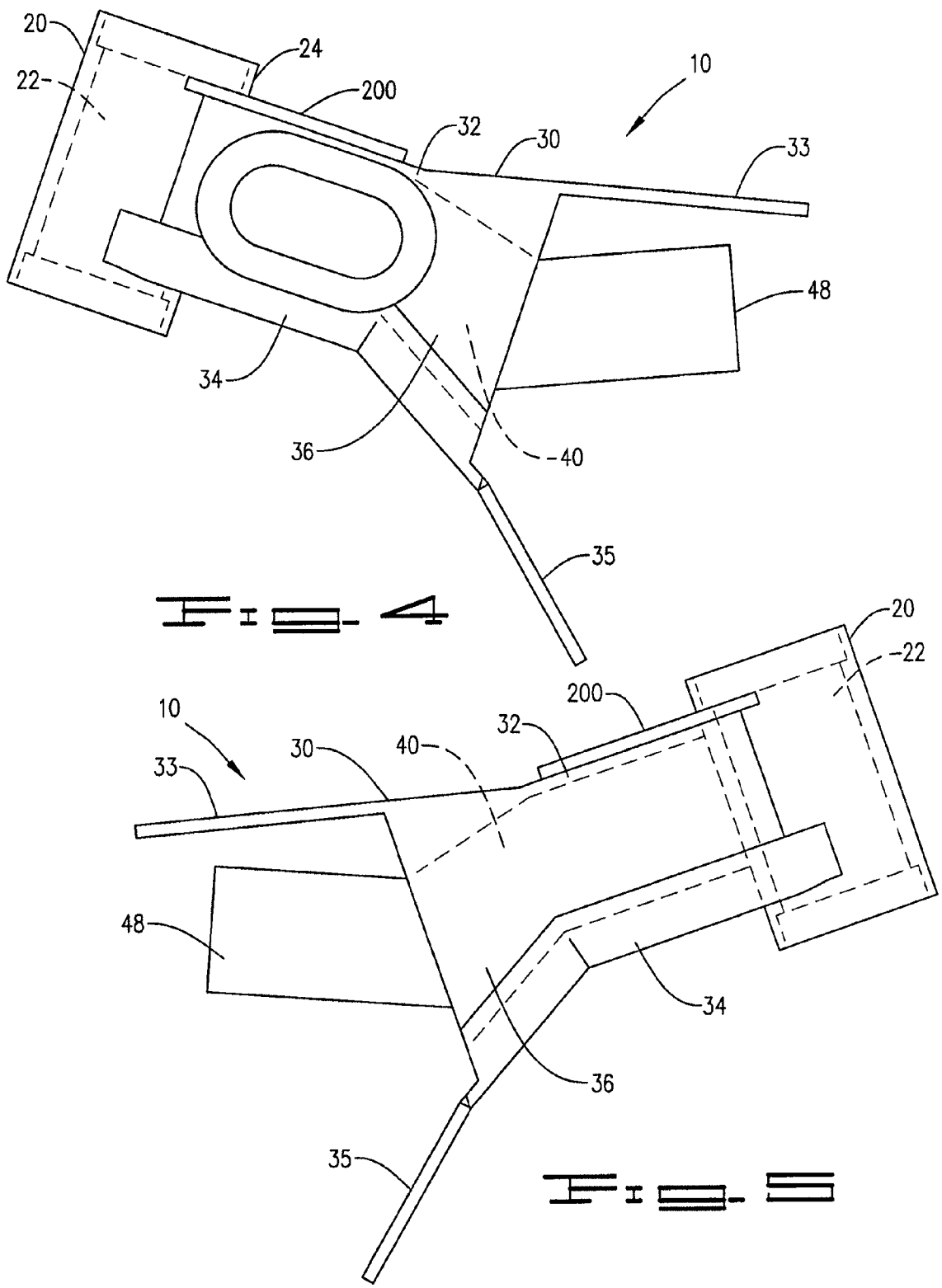

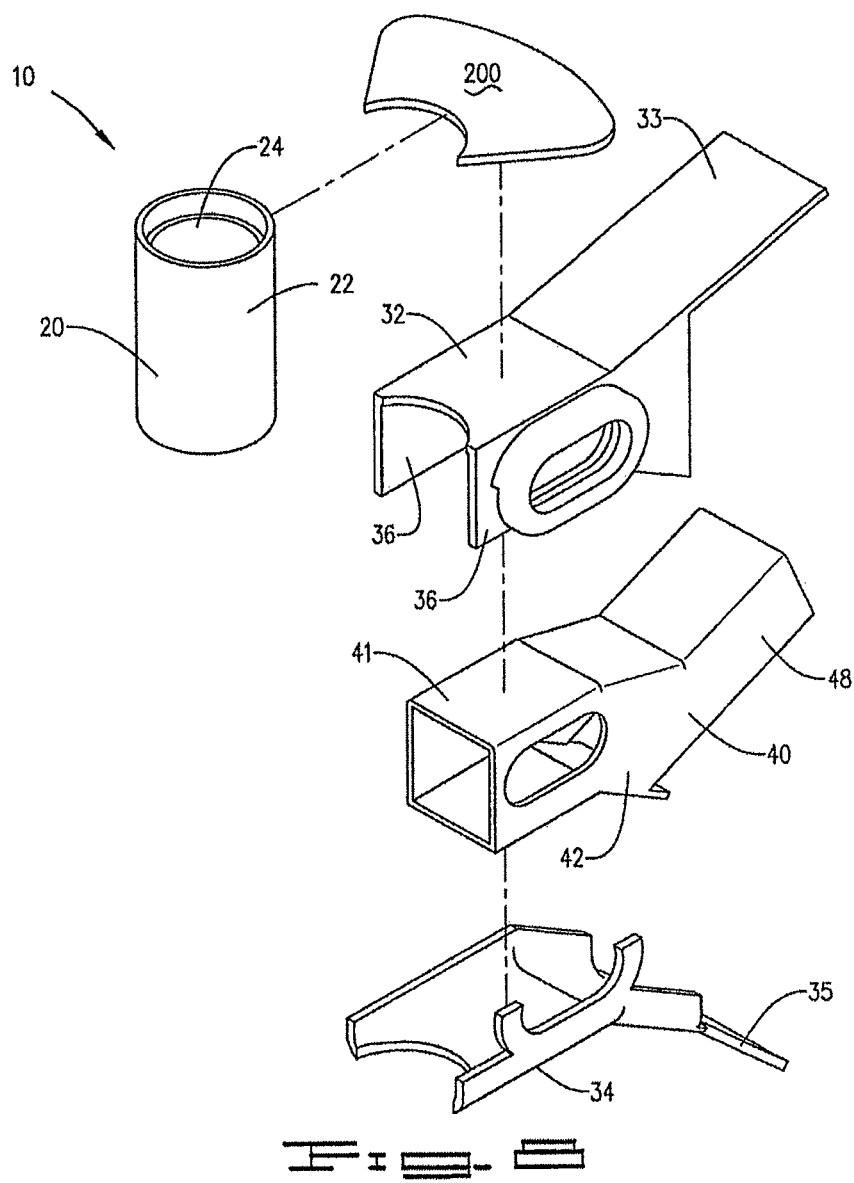

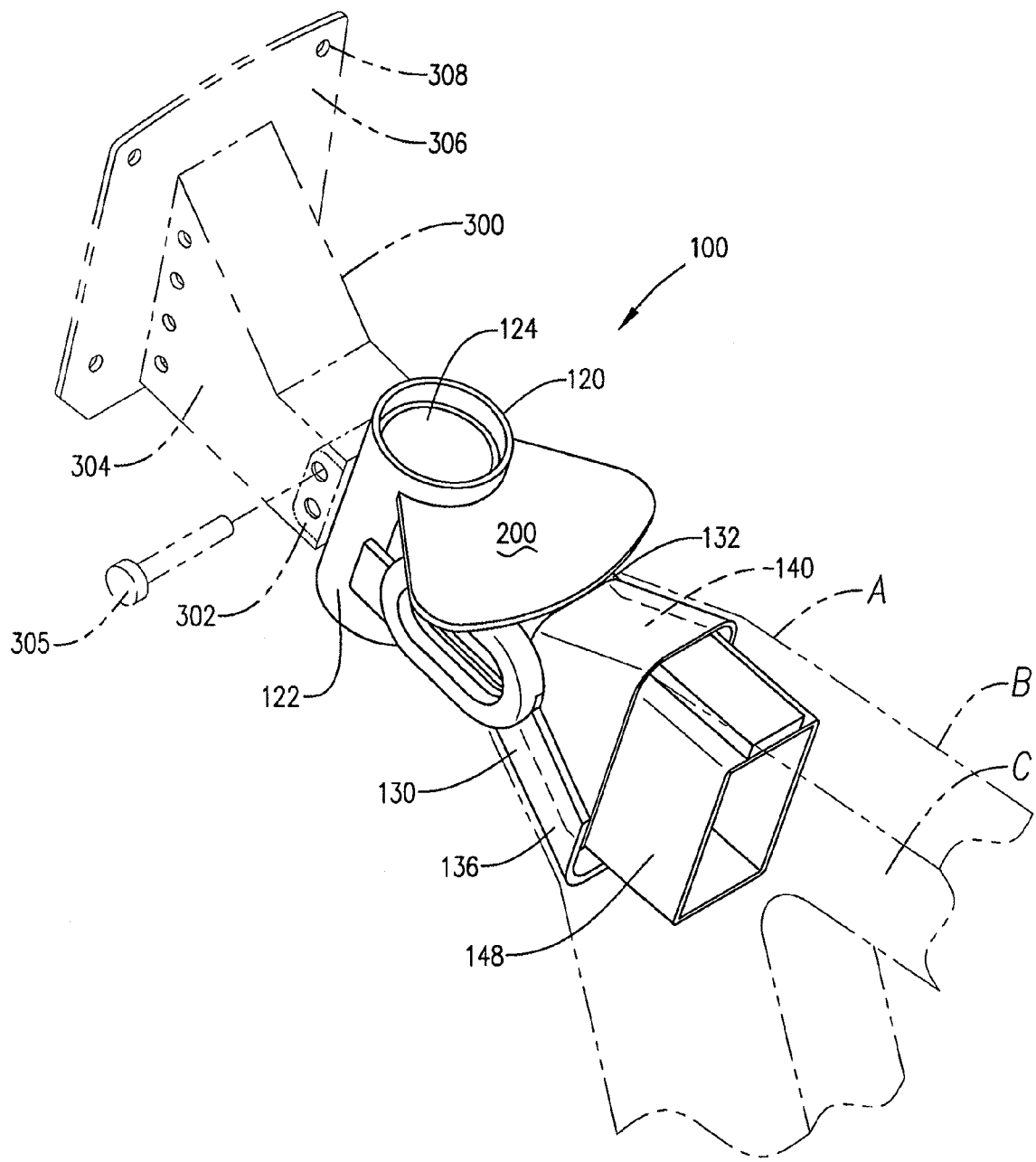

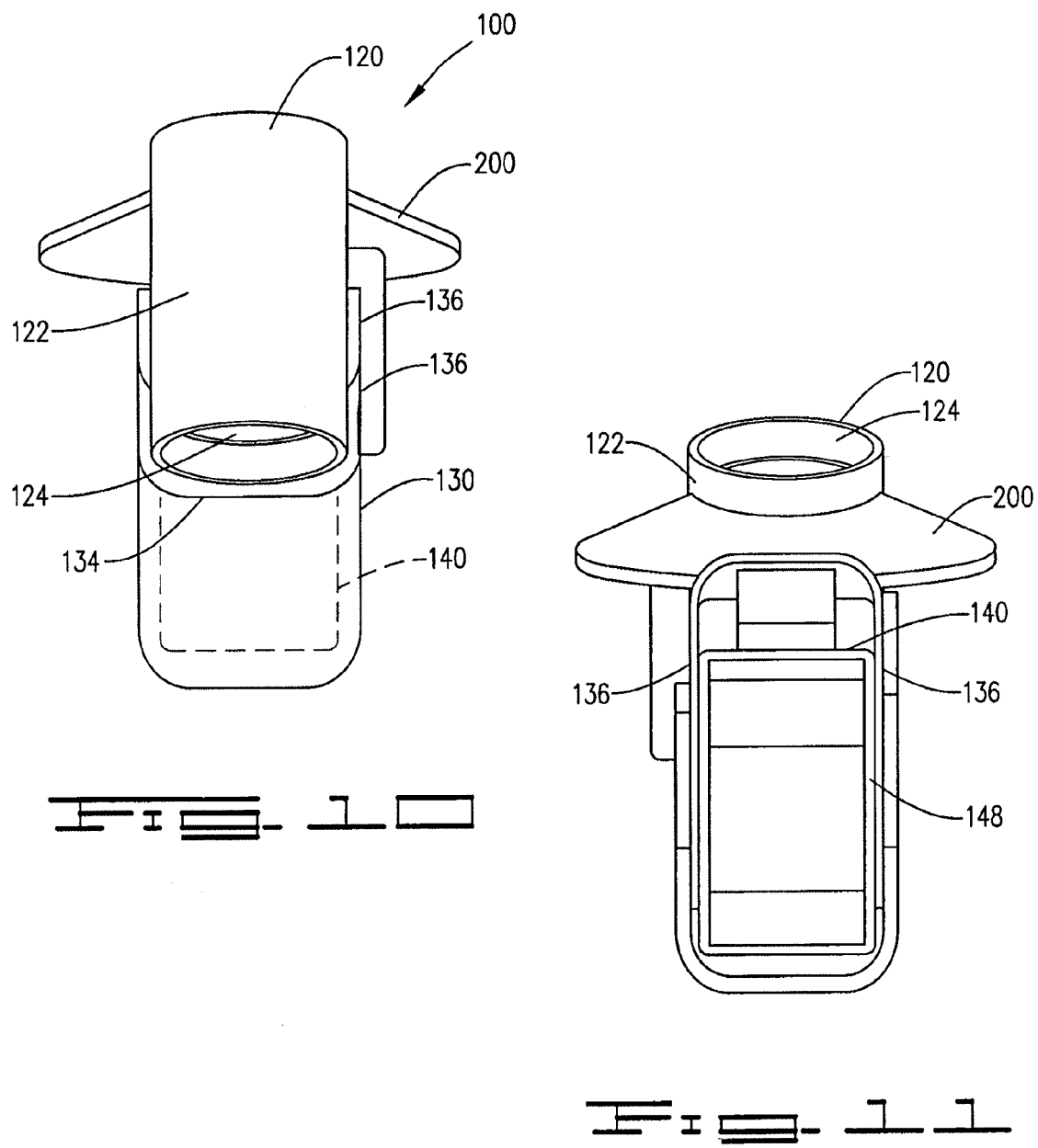

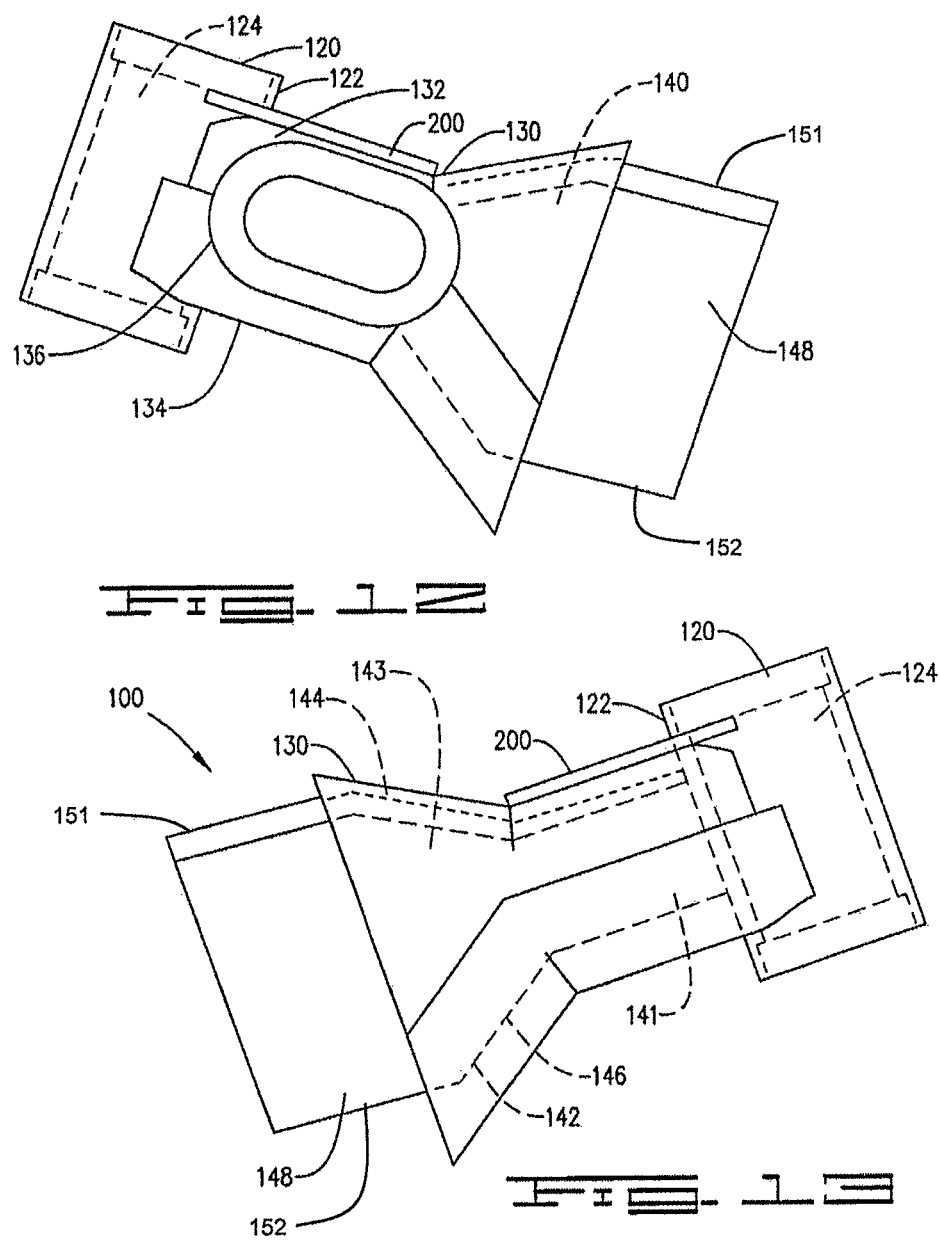

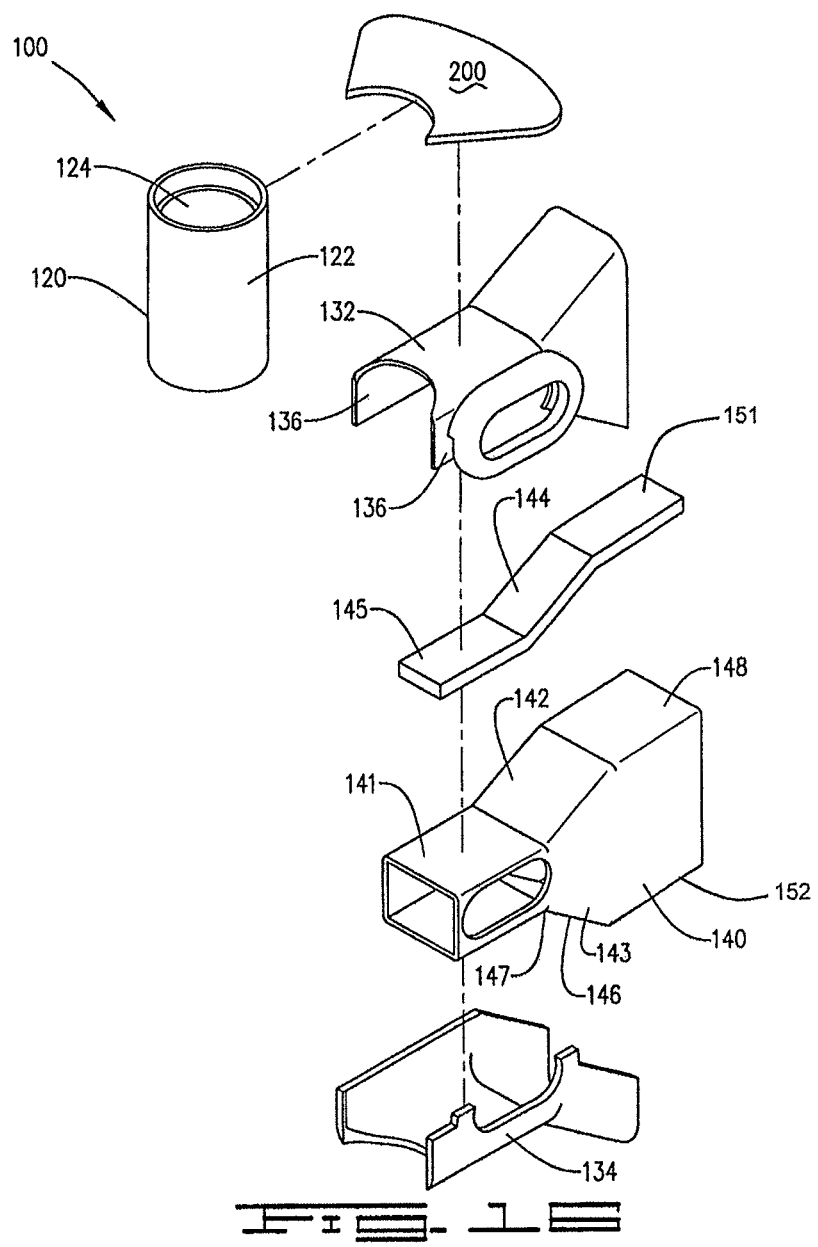

SLIP FIT NECK ADAPTER

CROSS-REFERENCE TO RELATED APPLICATION(S)

This application is a continuation of U.S. patent application Ser. No. 14/121,555, filed on Sep. 17, 2014, the disclosure of which is incorporated by reference herein.

STATEMENT OF FEDERALLY SPONSORED RESEARCH OR DEVELOPMENT

Not applicable.

FIELD OF THE DISCLOSURE

A replacement neck assembly for a motorcycle modifies the motorcycle frame to accept a larger front wheel diameter than the factory original, the replacement neck assembly providing the replacement neck, an optional fairing mount, the replacement neck accepting a factory or modified triple tree, whereby the motorcycle frame can accept the large front wheel without affecting the operating height of the motorcycle.

BACKGROUND OF THE DISCLOSURE

A preliminary review of prior art patents was conducted by the applicant which reveal prior art patents in a similar field or having similar use. However, the prior art inventions do not disclose the same or similar elements as the present replacement neck assembly, nor do they present the material components in a manner contemplated or anticipated in the prior art.

There does not appear to be a motorcycle frame replacement neck assembly in the prior art similar to or anticipating the present replacement neck, nor any replacement neck supplied to enlarge the front wheel diameter of a motorcycle. That does not mean that a person who builds motorcycles has not modified a motorcycle from its factory components, ordinarily and commonly done by owners with frequency. However, a replacement neck assembly for a motorcycle as shown in the drawings and as defined in the specification and claims herein is not present in the prior art.

There are several faring brackets shown in the prior art directed to the installation of a fairing. One such fairing bracket is disclosed in U.S. Patent Application No. 2006/0163900 to van der Hoeven, which discloses a pair of shaped brackets for a quick installation and quick removal of a motorcycle fairing to the neck of a motorcycle. Other bracket mounting appliances are shown in U.S. Pat. No. 8,424,949 to Ransone, U.S. Pat. No. 6,789,835 to Wargin and U.S. Pat. No. 4,461,508 to Ogishima. These are supplied in different shapes and embodiment, but all intended to attach a fairing to a motorcycle.

A motorcycle triple tree having an adjustable rake and height is shown in U.S. Pat. No. 8,720,928 to Delpit. The "rake" within the Delpit patent is defined as the angle between the front forks of a motorcycle and a line perpendicular to the ground upon which the motorcycle sits. The height adjustment is relative to the rake whereby the height adjustment is increased when the rake angle is decreased (FIG. 7). The present triple tree is provided to accommodate the replacement neck assembly adapting to a shorter neck.

SUMMARY OF THE DISCLOSURE

A motorcycle frame is usually a standard design, shape and dimension to accept a factory front wheel of a certain diameter, the motorcycle frame intended to accept a front wheel of a certain diameter. Depending on the factory specification, when one chooses to modify the components of a motorcycle for customization, changes are commonly made to the factory components to accept the modifications chosen by the owner, including certain frame components. This requires the removal of certain components prior to the addition of the modified components.

In prior art and the present field of motorcycle frame terminology, the front end of a motorcycle has two relative terms, height and rake, which are used to define the relationship between the front end including the front forks and attached front wheel and the motorcycle frame.

Height is the distance between the ground and the frame neck/triple tree connection while rake is commonly referred to as the angle between the front forks and a vertical line traversing the frame neck and line defining front fork projection. (See FIG. 7, Delpit patent).

The present invention is an after-market assembly which replaces a factory supplied neck on a motorcycle frame. More specifically, the replacement neck of the current invention is intended to modify a factory Harley-Davidson motorcycle frame to accept a 26 inch or a 30 inch front wheel, to attach a fairing to the replacement neck and to supply a new triple tree to the motorcycle which is modified by the installation of the replacement neck assembly. The replacement neck assembly has four embodiments—one for a Harley-Davidson Motorcycle from 1984-2008 with a 26" front wheel, from 1984 to 2008 with a 30" front wheel, from 2009 to present with a 26" front wheel, and from 2009 to present with a 30" front wheel.

BRIEF DESCRIPTION OF THE DRAWINGS

The following drawings are submitted with this utility patent application.

FIG. 2 is a front view of the first embodiment of the replacement slip fit neck adapter.

FIG. 3 is a rear view of the first embodiment of the replacement slip fit neck adapter.

FIG. 4 is a right side view of the first embodiment of the replacement slip fit neck adapter.

FIG. 5 is a left side view of the first embodiment of the replacement slip fit neck adapter.

FIG. 8 is an exploded view of the assembly components of the first embodiment of the replacement slip fit neck adapter.

FIG. 9 is an upper perspective view of a second embodiment of the replacement slip fit neck adapter attached to a motorcycle frame with the optional fairing mounting bracket shown in phantom line.

FIG. 10 is a front view of the second embodiment of the replacement slip fit neck adapter.

FIG. 11 is a rear view of the second embodiment of the replacement slip fit neck adapter.

FIG. 12 is a right side view of the second embodiment of the replacement slip fit neck adapter.

FIG. 13 is a left side view of the second embodiment of the replacement slip fit neck adapter.

FIG. 16 is an exploded view of the assembly components of the second embodiment of the replacement slip fit neck adapter.

DETAILED DESCRIPTION

Figure 1:
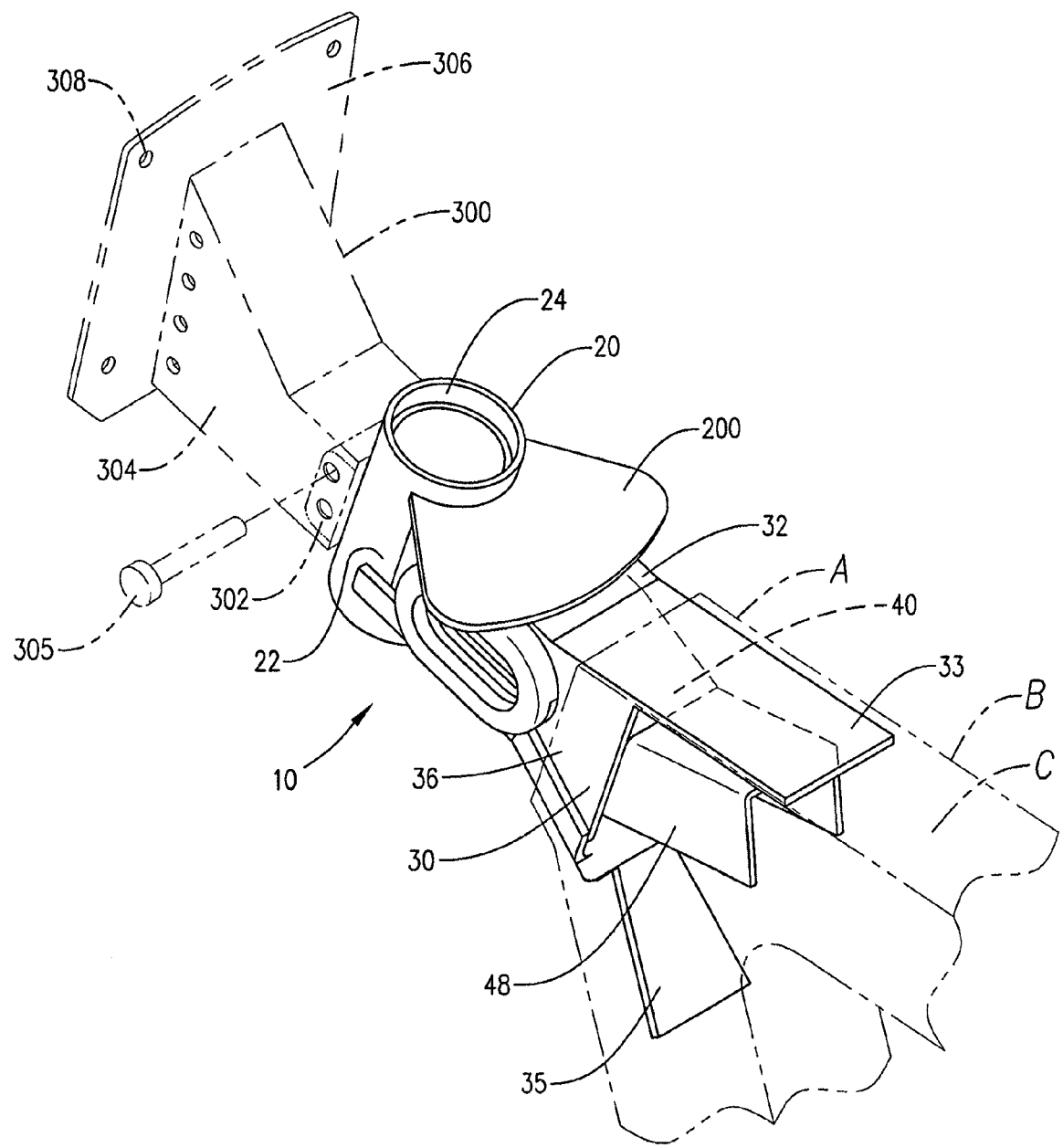
FIG. 1 is an upper perspective view of a first embodiment of the replacement slip fit neck adapter attached to a motorcycle frame with the optional fairing mounting bracket shown in phantom line.

A replacement slip fit neck adapter 10 for a motorcycle frame A maintaining the proper rake, height and vertical alignment of a motorcycle while modified to accept a 26 inch or a 30 inch front wheel. The replacement slip fit neck adapter 10 is provided in different embodiments for a 26 inch adaptation or a 30 inch adaptation to a Harley-Davidson motorcycle manufactured from 1984 to 2008 or for a Harley-Davidson motorcycle manufactured from 2009 to present, but the overall components are common among the varied embodiments.

The replacement slip fit neck adapter 10 for a 1984 to 2008 Harley Davidson motorcycle, FIGS. 1-8, comprises a cylindrical neck 20 having an outer surface 22 and an inner cylindrical bore 24, a rear frame connector assembly 30 defining an upper plate 32, a lower plate 34, a pair of side plates 36 and inner bent tubular frame extension 40. In addition, the replacement slip fit neck adapter 10 includes an optional fairing mounting bracket 300, the fairing mounting bracket 300 including a front neck bracket base 302, a plate support 304 and a front bracket plate 306 having a plurality of plate bores 308 through which a motorcycle fairing is attached, the bracket base 302 and plate support 304 being held together by at least two bracket mounting pins 305, allowing separation of the bracket base 302 and plate support 304 from one another when the fairing is not wanted by the operator.

The primary difference between the embodiments for the 26 inch and the 30 inch replacement slip fit neck adapter 10 for the 1984 to 2008 selected motorcycles is defined within the orientation and relative dimension of the inner bent tubular frame extension 40 and plate dimensions. In the 30 inch embodiment, the inner bent tubular frame extension 40 has a first section 41 welded to the outer surface 22 of the cylindrical neck 20, a lower angled extension section 42, and a frame member insertion section 48. The 26 inch embodiment has the same components, but the lower angled extension section 42 is shorter. In both embodiments, the height of the cylindrical neck 20 above the ground is raised but the motorcycle frame height remains consistent, with each cylindrical neck 20 on the slip fit neck adapter 10 elevated from the factory motorcycle frame at a certain distance to accommodate one of the selected larger front wheels. A modified triple tree, not shown, may also be required to complete the inclusion and installation of the replacement slip fit neck adapters 10.

Additionally, the 1984 to 2008 replacement slip fit neck adapter 10 has the upper plate 32 defining an upper extension flange 33 beyond the frame member insertion section 48, and the lower plate 34 having a lower extension flange 35 extending below the frame member insert section 48, FIG. 1, each extension flange 33, 35, mated and welded to a flat frame section B of the motorcycle frame A when the frame member insert section 48 is inserted within and welded to the motorcycle tubular frame C which remains after the factory supplied neck is cut off and removed from the motorcycle frame A prior to the attachment of the replacement slip fit neck adapter 10 of the present invention.

The shape and outer diameter of the frame member insert section 48 must be slightly smaller than an inner diameter of the tubular frame C of the motorcycle frame A within and to which the replacement slip fit neck adapter 10 is inserted and attached.

In the replacement slip fit neck adapter 100 for the 2009 to present Harley Davidson motorcycle frames, FIGS. 9-16, the replacement slip fit neck adapter 100 comprises a cylindrical neck 120 having an outer surface 122 and an inner cylindrical bore 124, a rear frame connector assembly 130 defining a upper plate 132, a lower plate 134, a pair of side plates 136 and an inner tubular frame extension 140. In addition, the replacement slip fit neck adapter 100 includes an optional fairing mounting bracket 300, the fairing bracket 300 including a front neck bracket base 302, a plate support 304 and a front bracket plate 306 having a plurality of plate bores 308 through which a motorcycle fairing is attached, the bracket base 302 and plate support 304 held together by at least two bracket mounting pins 305, allowing removal of the bracket base 302 and plate support 304 to be removed from one another when the fairing is not wanted by the operator.

The primary difference between the embodiments for the 26 inch and the 30 inch replacement slip fit neck adapter 100 for the selected 2009 to present motorcycles is defined within the orientation and relative dimension of the inner tubular frame extension 140 and plate dimension. In the 30 inch embodiment, the inner tubular frame extension 140 defines a neck extension section 141 welded to the cylindrical neck 120, an intermediate extension section 142 extending from the neck extension section 141 having an expanding flare section 143 with an upper margin 144 having a flat profile 145 with the neck extension section 141 and an elongated lower margin 146 defining an outer obtuse angle 147 with the neck extension section 141 with the upper, lower and side plates 132, 134 and 136, having a similar contour as the expanded flare section 143, and an expanded frame insert member 148 extending from the intermediate extension section 142 in alignment with the neck extension section 141 having a size and outer diameter suited for insertion within the motorcycle frame A at the point the factory supplied neck is removed. The 26 inch embodiment has the same components, but the intermediate extension section 142 extending between the neck extension section 141 and the expanded frame insert member 148 has an upper margin 151 defining an upward angle and a lower margin 152 defining a lower angle, wherein the cylindrical neck 120 of the motorcycle frame A with each extension is elevated from the height of the factory motorcycle frame at a certain distance to accommodate the selected large front wheel.

In all of the embodiments, the frame member insert section 48 or the expanded frame insert member 148 is inserted within the cutoff section of the motorcycle frame A with the frame member insert section 48 or expanded frame insert member 148 welded within the motorcycle tubular frame C and the upper, side and lower plates 32/132, 34/134, 36/136, are welded to the same tubular frame C, wherein the plate surfaces and motorcycle tubular frame are mated, the welded areas ground down and prepared for painting, thereby concealing the connection between the replacement slip fit neck adapter 100, and the factory motorcycle frame A. See FIGS. 1 and 9. The shape and size of the frame member insert section 48 or the expanded frame insert member 148 must be slightly smaller than the inner diameter of the tubular frame C of the motorcycle frame A within and to which the replacement slip fit neck adapter 100 is applied.

The remaining components of the motorcycle should remain intact once the replacement slip neck adapter 100, for the appropriately sized increased diameter front wheel without need for modification as the replacement slip fit neck adapter 100, by adapting the height of the cylindrical neck to accommodate the front wheel allows the motorcycle to remain at the same operational height for the rider. However, certain modifications may be required by the addition of a modified triple tree to accept longer front forks, modified suspension elements or necessary modifications to the front brakes required by having a larger front wheel. A modified triple tree, not shown, which includes alternative adjustment as disclosed in the prior art patent to Delpit, supra., may be used to further adjust the rake or overall height of the motorcycle, and used in conjunction with the replacement slip fit neck adapter.

Figure 6:
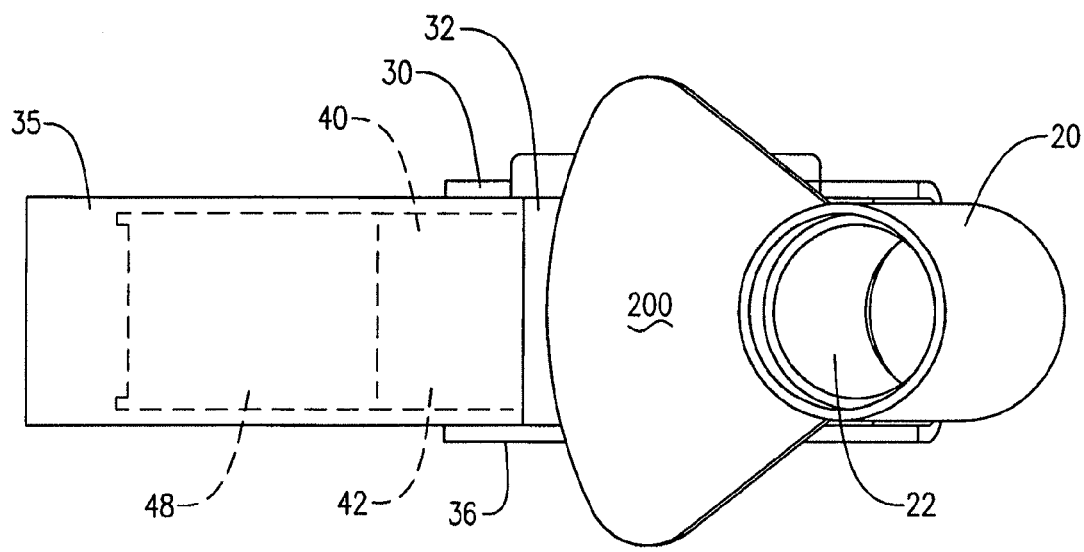
FIG. 6 is a top view of the first embodiment of the replacement slip fit neck adapter.
Figure 7:
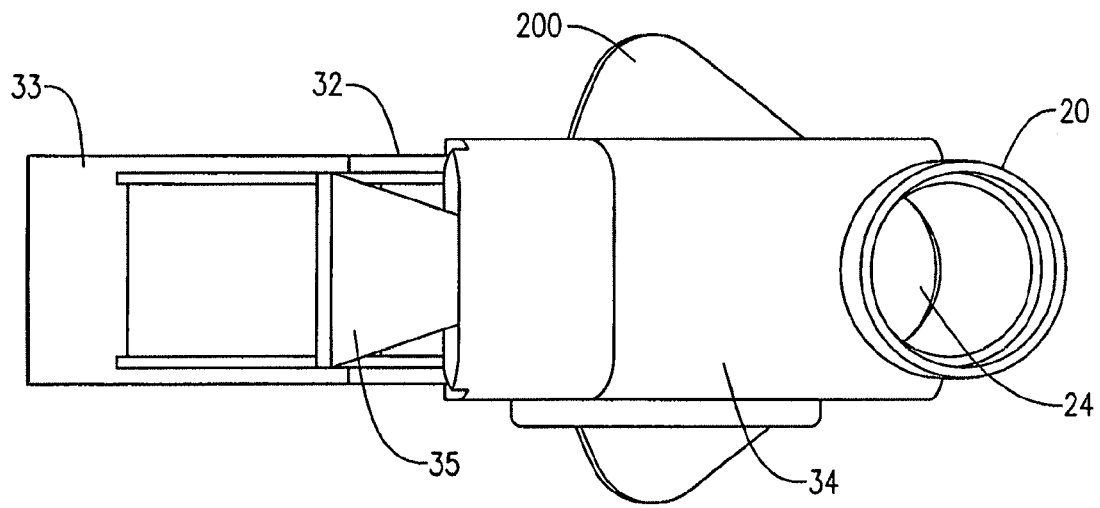
FIG. 7 is a lower view of the first embodiment of the replacement slip fit neck adapter.
Figure 14:
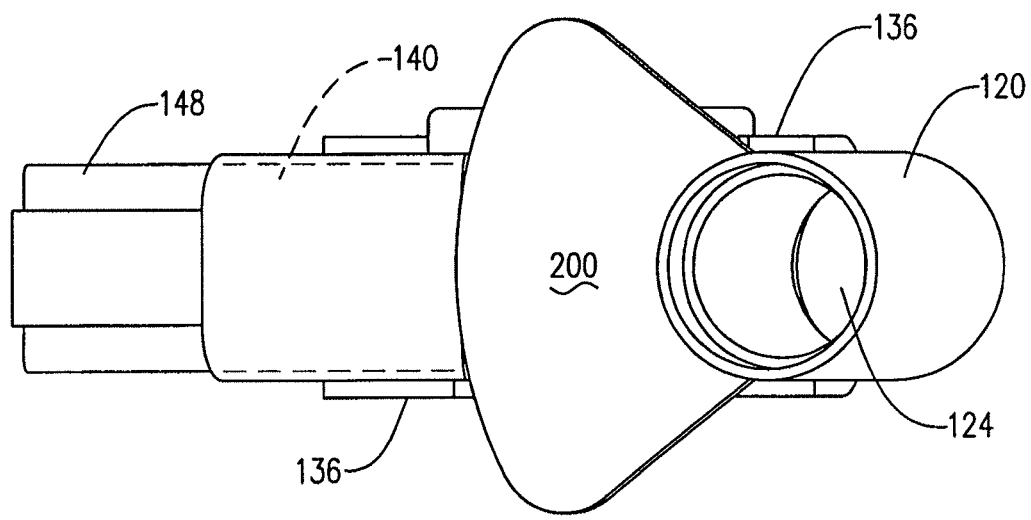
FIG. 14 is a top view of the second embodiment of the replacement slip fit neck adapter.
Figure 15:
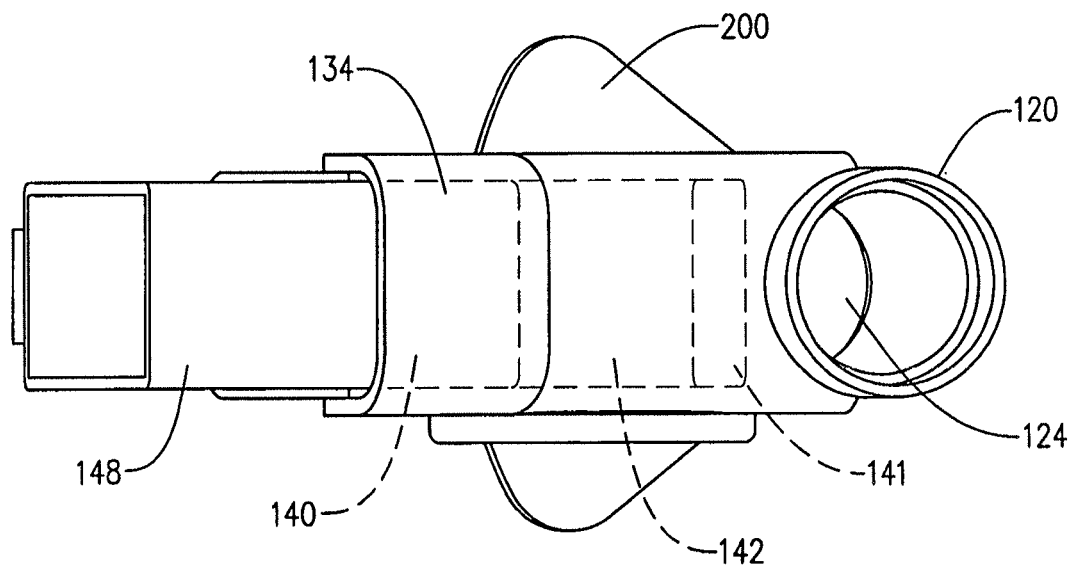
FIG. 15 is a lower view of the second embodiment of the replacement slip fit neck adapter.

The replacement slip fit neck adapter 10, 100 is installed onto an appropriate motorcycle frame A in the following manner, comprising the steps of marking the motorcycle frame along a location for the existing neck to be removed pursuant to instructions of the manufacturer of the replacement slip fit neck adapter, cutting the motorcycle frame along the marked lines, removing excess paint and burrs, beveling the edge of the neck leaving a flat surface facing forward, marking and punching cutout locations within the motorcycle frame for drilling holes at least ½ inch in diameter as directed by the manufacturer of the replacement slip fit neck adapter 10, 100, deburring the holes, inserting the frame member insertion section 48 or the expanded frame insert member 148 into the tubular frame C cut portion of the motorcycle frame A and securing the replacement slip fit neck adapter 10, 100, to the frame using clamps and/or temporary magnetic plates, tack welding the corresponding upper, lower and side plates 32/132, 34/134, 36/136, to the motorcycle frame A, rosette welding all the drilled holes to the exposed frame member insertion section 48 or the expanded frame insert member 148 within the motorcycle frame A until the rosette welds are flush or above the surface of the motorcycle frame A within the drilled holes, welding the top, bottom and side plates 32/132, 34/134, 36/136, to the motorcycle frame A around the entire perimeter of the tubular frame C, grinding, sanding and cleaning the welds and surfaces to a smooth finish, and painting the welded portions of the motorcycle frame A and the replacement slip fit neck adapter 10, 100, to a suitable finish. At this point, once the painting is finished, the triple tree, forks, enlarged intended sized front wheel, all electrical connections and wiring and other operational connections can be completed with the motorcycle being placed in operational service. A manufacture's logo plate, 200, may also be included as an additional ornamental aspect welded to the outer surface 22, 122 of the cylindrical neck 20, 120, as shown in FIGS. 1 and 6, which also provides additional stability and thickness to the attachment of each replacement slip fit neck 10, 100.

While the slip fit neck adapters, 10, 100, have been particularly shown and described with reference to a preferred embodiment thereof, it will be understood by those skilled in the art that changes in form and detail may be made therein without departing from the spirit and scope of the invention.

What is claimed is:

1. A motorcycle neck adapter for replacing a factory supplied neck of a motorcycle frame, the motorcycle neck adapter comprising:
    a neck having an inner cylindrical bore;
    a rear frame connector extending distally from the neck, the rear frame connector comprising:
    an upper plate having a first contour that expands distally to a first end of the upper plate;
    a lower plate spaced vertically from the upper plate and having a second contour that expands distally to a second end of the lower plate; and
    a frame insert member extending distally from the rear frame connector and disposed between the first end of the upper plate and the second end of the lower plate, the first end of the upper plate and the second end of the lower plate each abutting the motorcycle frame and the rear frame connector elevating the neck from a factory height of the factory supplied neck when the frame insert member is fully inserted into the motorcycle frame at a point where the factory supplied neck is removed from the motorcycle frame.

2. The motorcycle neck adapter recited in claim 1 further comprising:
    a front neck bracket base located on the neck opposite the rear frame connector, the front neck bracket base comprising a plurality of holes each receiving a corresponding bracket mounting pin of a plurality of bracket mounting pins.

3. The motorcycle neck adapter recited in claim 2 further comprising a fairing bracket attached to the front neck bracket base with the bracket mounting pins, the fairing bracket comprising:
    a plate support extending from the neck opposite the rear frame connector; and
    a front bracket plate extending from the plate support, wherein the front bracket plate includes a plurality of plate bores through which a motorcycle fairing can be attached.

4. The motorcycle neck adapter recited in claim 1, wherein the dimensions of the upper and lower plates of the rear frame connector are such that an original rake and vertical alignment of a motorcycle being modified is maintained when a 26 inch front wheel is installed.

5. The motorcycle neck adapter recited in claim 1, wherein the dimensions of the upper and lower plates of the rear frame connector are such that an original rake and vertical alignment of a motorcycle being modified is maintained when a 30 inch front wheel is installed.

6. The motorcycle neck adapter recited in claim 1, wherein the rear frame connector further comprises:
    a first side plate having a third contour that expands distally to a third end of the first side plate; and
    a second side plate spaced horizontally from the first side plate and having a fourth contour that expands distally to a fourth end of the second side plate.

7. The motorcycle neck adapter recited in claim 6, wherein the dimensions of the upper and lower plates of the rear frame connector are such that an original rake and vertical alignment of a motorcycle being modified is maintained when a 26 inch front wheel is installed.

8. The motorcycle neck adapter recited in claim 6, wherein the dimensions of the upper and lower plates of the rear frame connector are such that an original rake and vertical alignment of a motorcycle being modified is maintained when a 30 inch front wheel is installed.

9. A motorcycle neck adapter comprising:
    a neck having an inner cylindrical bore;
    a rear frame connector extending from the neck;
    a frame insert member extending from the rear frame connector; and a front neck bracket base located on the neck opposite the rear frame connector; the front neck bracket base comprising a plurality of holes, wherein each hole of the plurality of holes receives a corresponding bracket mounting pin of a plurality of bracket mounting pins.

10. The motorcycle neck adapter recited in claim 9 further comprising a fairing bracket attached with the bracket mounting pins to the front neck bracket base, the fairing bracket comprising:
   a plate support extending from the neck opposite the rear frame connector; and
   a front bracket plate extending from the plate support, wherein the front bracket plate includes a plurality of plate bores through which a motorcycle fairing can be attached.

11. The motorcycle neck adapter recited in claim 9, wherein the rear frame connector is sized to a dimension such that an original rake and vertical alignment of a motorcycle being modified is maintained when a 26 inch front wheel is installed.

12. The motorcycle neck adapter recited in claim 9, wherein the rear frame connector is sized to a dimension such that an original rake and vertical alignment of a motorcycle being modified is maintained when a 30 inch front wheel is installed.

13. The motorcycle neck adapter recited in claim 9, wherein the rear frame connector further comprises:
   an upper plate having a first contour that expands distally to a first end of the upper plate;
   a lower plate spaced vertically from the upper plate and having a second contour that expands distally to a second end of the lower plate;
   a first side plate having a third contour that expands distally to a third end of the first side plate; and
   a second side plate spaced horizontally from the first side plate and having a fourth contour that expands distally to a fourth end of the second side plate.

14. The motorcycle neck adapter recited in claim 13, wherein the rear frame connector is sized to a dimension such that an original rake and vertical alignment of a motorcycle being modified is maintained when a 26 inch front wheel is installed.

15. The motorcycle neck adapter recited in claim 13, wherein the rear frame connector is sized to a dimension such that an original rake and vertical alignment of a motorcycle being modified is maintained when a 30 inch front wheel is installed.

* * * * *